United States Patent
Yang et al.

(10) Patent No.: US 10,201,005 B2
(45) Date of Patent: Feb. 5, 2019

(54) METHOD FOR TRANSMITTING AND RECEIVING CONTROL CHANNEL AND DEVICE THEREFOR

(71) Applicant: LG ELECTRONICS INC., Seoul (KR)

(72) Inventors: Suckchel Yang, Seoul (KR); Hanbyul Seo, Seoul (KR); Kijun Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/770,377

(22) PCT Filed: Mar. 13, 2014

(86) PCT No.: PCT/KR2014/002141
§ 371 (c)(1),
(2) Date: Aug. 25, 2015

(87) PCT Pub. No.: WO2014/142593
PCT Pub. Date: Sep. 18, 2014

(65) Prior Publication Data
US 2016/0014802 A1   Jan. 14, 2016

Related U.S. Application Data

(60) Provisional application No. 61/780,846, filed on Mar. 13, 2013.

(51) Int. Cl.
*H04W 72/12* (2009.01)
*H04L 5/00* (2006.01)
(Continued)

(52) U.S. Cl.
CPC ......... *H04W 72/1278* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2012/0093112 A1    4/2012   Qu et al.
2012/0320838 A1*  12/2012   Yang .................... H04W 72/02
                                                                    370/329

(Continued)

FOREIGN PATENT DOCUMENTS

KR   10-2010-0031510       3/2010
KR   10-2011-0112789      10/2011
(Continued)

OTHER PUBLICATIONS

PCT International Application No. PCT/KR2014/002141, Written Opinion of the International Searching Authority dated Jul. 22, 2014, 21 pages.

(Continued)

*Primary Examiner* — Christopher M Crutchfield
*Assistant Examiner* — Thinh D Tran
(74) *Attorney, Agent, or Firm* — Lee Hong Degerman Kang Waimey

(57) ABSTRACT

The present invention relates to a method for receiving a control channel in a wireless communication system and a device therefor, the method comprising the step of detecting a first-type control channel in a control region of a specific subframe, wherein: when second-type control channel based scheduling transmitted through a data region of a subframe is configured for a terminal and the first-type control channel is detected from a resource region in which a first search space and a second search space overlap, it is determined that the first-type control channel is connected with the first search space; and the first search space is a search space commonly configured for a plurality of terminals, and the (Continued)

second search space is a search space specifically configured for the terminal.

14 Claims, 13 Drawing Sheets

(51) Int. Cl.
  *H04W 88/06* (2009.01)
  *H04W 48/12* (2009.01)
(52) U.S. Cl.
  CPC ... *H04W 72/1215* (2013.01); *H04W 72/1231* (2013.01); *H04L 5/0048* (2013.01); *H04W 48/12* (2013.01); *H04W 88/06* (2013.01)

(56) References Cited

U.S. PATENT DOCUMENTS

2013/0058240 A1* 3/2013 Kim ................ H04L 5/0007
                                                         370/252
2014/0307693 A1* 10/2014 Feng ................ H04L 27/2602
                                                         370/329

FOREIGN PATENT DOCUMENTS

| KR | 10-2012-0123471 |   | 11/2012 |
|----|-----------------|---|---------|
| WO | WO2011112036    | * | 9/2011  |
| WO | WO2011126329    | * | 10/2011 |

OTHER PUBLICATIONS

3rd Generation Partnership Project (3GPP), Technical Specification Group Radio Access Network; Evolved Universal Terrestrial Radio Access (E-UTRA); Physical layer procedures (Release 11), 3GPP TS 36.213 V11.1.0, Dec. 2012, 161 pages.

PCT International Application No. PCT/KR2014/002141, Written Opinion of the International Searching Authority dated Jul. 22, 2014, 15 pages.

* cited by examiner

FIG. 12
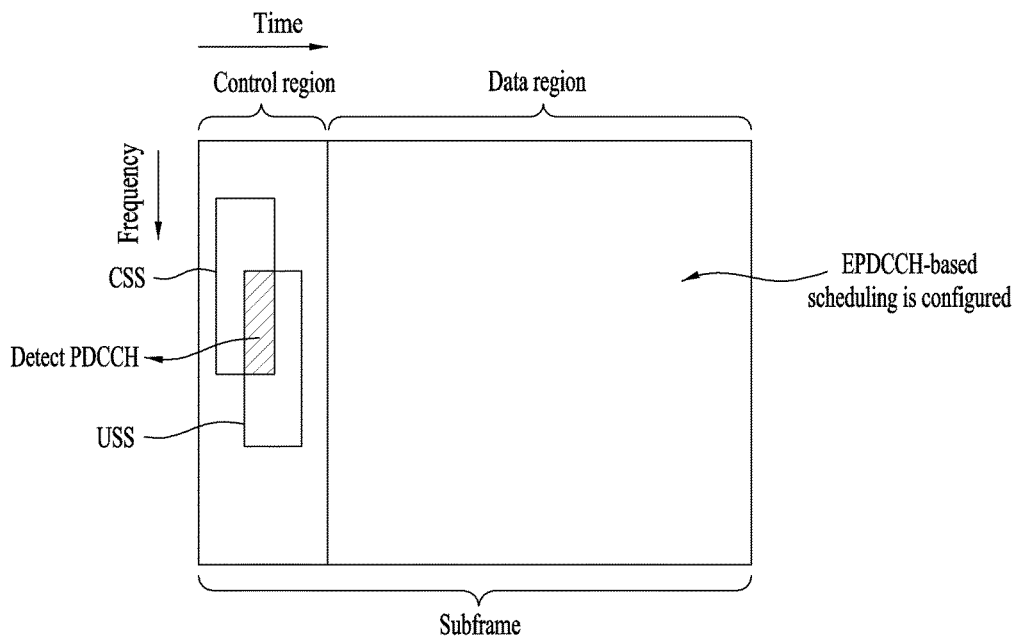
(a) When EPDCCH-based scheduling is configured for a UE and a PDCCH is detected in an SS overlapping region of CSS and USS, the PDCCH is determined to be associated with CSS.
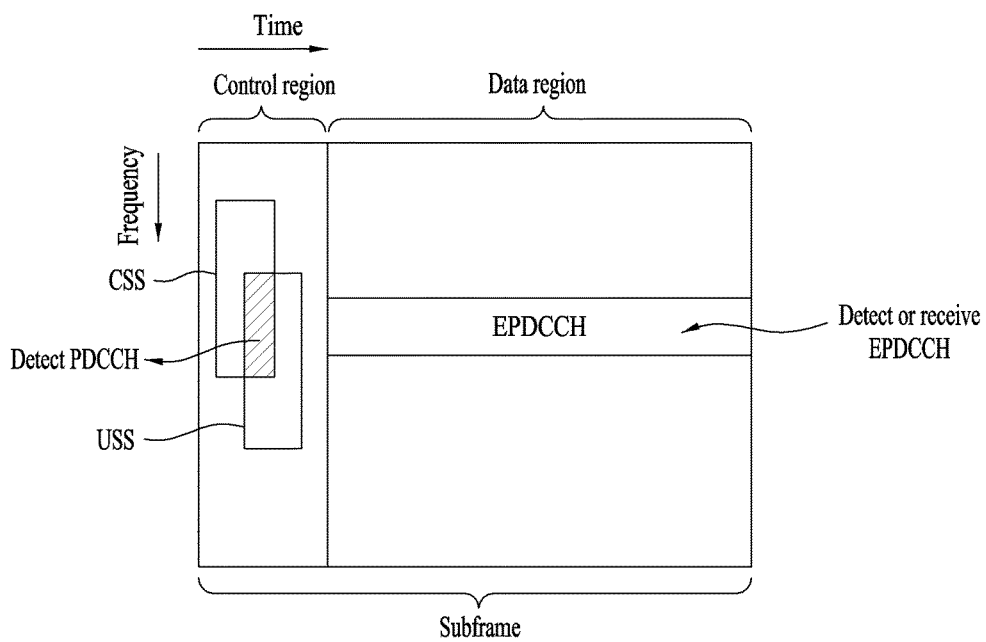
(b) When UE detects or receives an EPDCCH in a data region of a specific subframe, a PDCCH detected in an SS overlapping region of CSS and USS is determined to be associated with CSS.

METHOD FOR TRANSMITTING AND RECEIVING CONTROL CHANNEL AND DEVICE THEREFOR

CROSS-REFERENCE TO RELATED APPLICATIONS

This application is the National Stage filing under 35 U.S.C. 371 of International Application No. PCT/KR2014/002141, filed on Mar. 13, 2014, which claims the benefit of U.S. Provisional Application No. 61/780,846, filed on Mar. 13, 2013, the contents of which are all hereby incorporated by reference herein in their entirety.

TECHNICAL FIELD

The present invention relates to a wireless communication system, more specifically, a method and apparatus for preventing a faulty operation of a user equipment in case of a plurality of search spaces being overlapped.

BACKGROUND ART

Wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method and apparatus for efficiently transmitting a downlink control channel.

Another object the present invention is to provide a method and apparatus for preventing a faulty operation of a user equipment (UE) when a plurality of search spaces overlaps with each other.

Another object the present invention is to provide a method and apparatus for preventing ambiguity or misalignment of transmitted and received control channels due to the overlapping regions when a plurality of search spaces overlaps with each other.

It is to be understood that both the foregoing general description and the following detailed description of the present invention are exemplary and explanatory and are intended to provide further explanation of the invention as claimed.

Technical Solution

In an aspect of the present invention, provided herein is a method for receiving a control channel by a user equipment (UE) in a wireless communication system, the method comprising: detecting a first type control channel in a control region of a specific subframe, wherein when scheduling based on a second type control channel transmitted through a data region of a subframe is configured for the UE and the first type control channel is detected in a resource region in which a first search space and a second search space overlap with each other, the first type control channel is determined to be associated with the first search space, and wherein the first search space is a search space commonly configured for a plurality of UEs and the second search space is a search space UE-specifically configured for the UE.

In another aspect of the present invention, provided herein is a user equipment (UE) configured to operate in a wireless communication system, the UE comprising: a processor configured to detect a first type control channel in a control region of a specific subframe, wherein when scheduling based on a second type control channel transmitted through a data region of a subframe is configured for the UE and the first type control channel is detected in a resource region in which a first search space and a second search space overlap with each other, the first type control channel is determined to be associated with the first search space, and wherein the first search space is a search space commonly configured for a plurality of UEs and the second search space is a search space UE-specifically configured for the UE.

Preferably, when the UE detects or receives the second type control channel through a data region of the specific subframe, the first type control channel detected in the resource region in which the first search space and the second search space overlap with each other is determined to be associated with the first search space.

Preferably, when the UE detects or receives the second type control channel through the data region of the specific subframe, if cross carrier scheduling is configured, the first type control channel is determined to be associated with the first search space, and if cross carrier scheduling is not configured, the first type control channel is determined to be associated with the second search space.

Preferably, the first type control channel is determined to be associated with the first search space only when the first search space and the second search space fully overlap with each other in the specific subframe.

Preferably, the first type control channel detected through the overlap resource region is scrambled with a same cyclic redundancy check (CRC), has a same payload size, or has a same first control channel element index with respect to the first search space and the second search space.

Preferably, the first type control channel detected through the overlap resource region has carrier indicator fields with different sizes, has sounding reference signal (SRS) request fields with different sizes, or channel state information (CSI) request fields with different sizes with respect to the first search space and the second search space.

Preferably, the detecting comprises monitoring the first type control channel in the remaining resource region except for the overlap resource region in the first search space.

Advantageous Effects

According to the present invention, a downlink control channel may be efficiently transmitted and received.

In addition, according to the present invention, when a plurality of search spaces overlaps with each other, a faulty operation of a user equipment (UE) may be prevented.

In addition, according to the present invention, when a plurality of search spaces overlaps with each other, ambiguity or misalignment of transmitted and received control channels due to the overlapping regions may be prevented.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 12 illustrates a flowchart of a control channel transmitting and receiving method according to an embodiment of the present invention.

DETAILED DESCRIPTION

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In a wireless access system, a link for receiving a signal by a UE from a BS is referred to as downlink (DL) and a link for transmitting a signal by a UE to a BS is referred to as uplink (UL).

Figure 1:
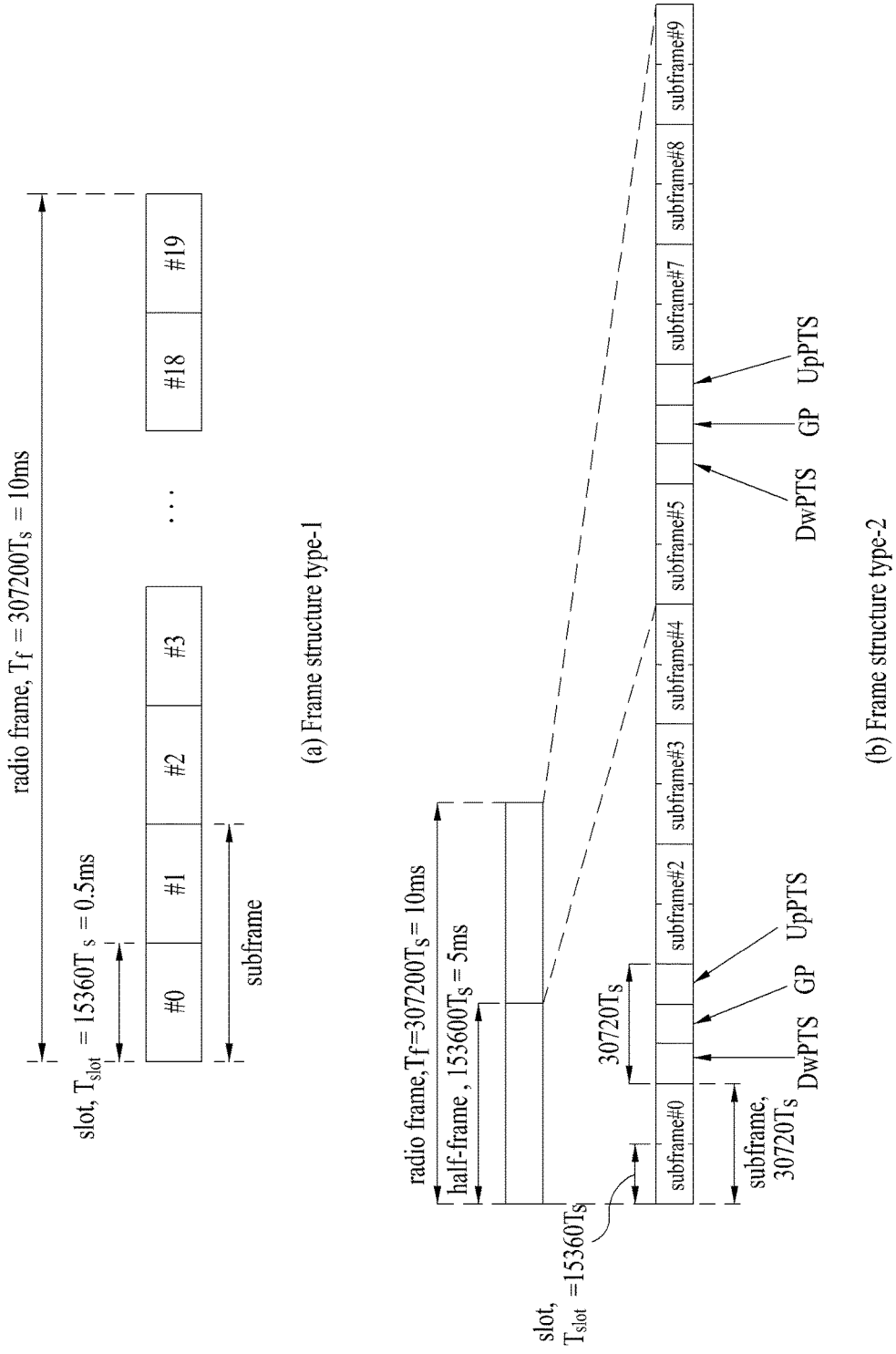
FIG. 1 illustrates a structure of a radio frame used in the LTE(-A) system.

FIG. 1 illustrates a structure of a radio frame used in the LTE(-A) system. In a cellular OFDM radio packet communication system, uplink/downlink data packet transmission is performed in the unit of a subframe (SF), and one subframe is defined as a predetermined duration including a plurality of OFDM symbols. The LTE(-A) system supports a type-1 radio frame structure applicable to frequency division duplex (FDD) and a type-2 radio frame structure applicable to time division duplex (TDD).

FIG. 1(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol duration. In the LTE (-A) system, since SC-FDMA is used in uplink, an OFDM symbol may be referred to as an SC-FDMA symbol in the present specification, and also may be collectively referred to as a symbol duration. A resource block (RB) as a resource assignment unit may include a plurality of consecutive subcarriers in one slot.

The length of one symbol duration (or the number of OFDM symbols included in one slot) may vary according to a configuration of cyclic prefix (CP). The cyclic prefix refers to repeating a portion of symbol (e.g. the last portion of symbol) or the entire symbol and placing the repeated portion in front of the symbol. The cyclic prefix is used to remove inter-symbol interferences or facilitate a channel measurement of frequency-selective multi-path channel. The cyclic prefix includes an extended CP and a normal CP. For example, if OFDM symbols are configured by the normal CP, the number of OFDM symbols included in one slot may be 7. In case of the extended CP, for example, the number of OFDM symbols included in one slot may be 6.

FIG. 1(b) illustrates a structure of the type-2 radio frame. The type-2 radio frame includes two half frames, and each half frame includes five subframes, a downlink period (e.g. a downlink pilot time slot or DwPTS), a guard period (GP) and an uplink period (e.g. an uplink pilot time slot or UpPTS). One subframe includes two slots. For example, The downlink period (e.g., DwPTS) is used for initial cell search, synchronization or channel estimation of a UE. For example, the uplink period (e.g., UpPTS) is used for channel estimation of a BS and uplink transmission synchronization of a UE. For example, the uplink period (e.g., UpPTS) may be used to transmit a sounding reference signal (SRS) for channel estimation in a base station and to transmit a physical random access channel (PRACH) that carriers a random access preamble for uplink transmission synchronization. The guard period is used to eliminate interference generated in uplink due to multi-path delay of a downlink signal between uplink and downlink. Table 1 shows an example of an uplink-downlink (UL-DL) configuration of subframes within a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a downlink subframe (DL SF), U represents an uplink subframe (UL SF), and S represents a special subframe. The special subframe includes a downlink period (e.g. DwPTS), a guard period (e.g. GP), and an uplink period (e.g. UpPTS). Table 2 shows an example of a special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$, | 5120 · $T_s$ |
| 5 | 6592 · $T_s$ | 4384 · $T_s$, | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described radio frame structure is exemplary. Thus, the number of subframes in a radio frame, the number of slots in a subframe, or the number of symbols in a slot may be modified in various ways.

Figure 2:
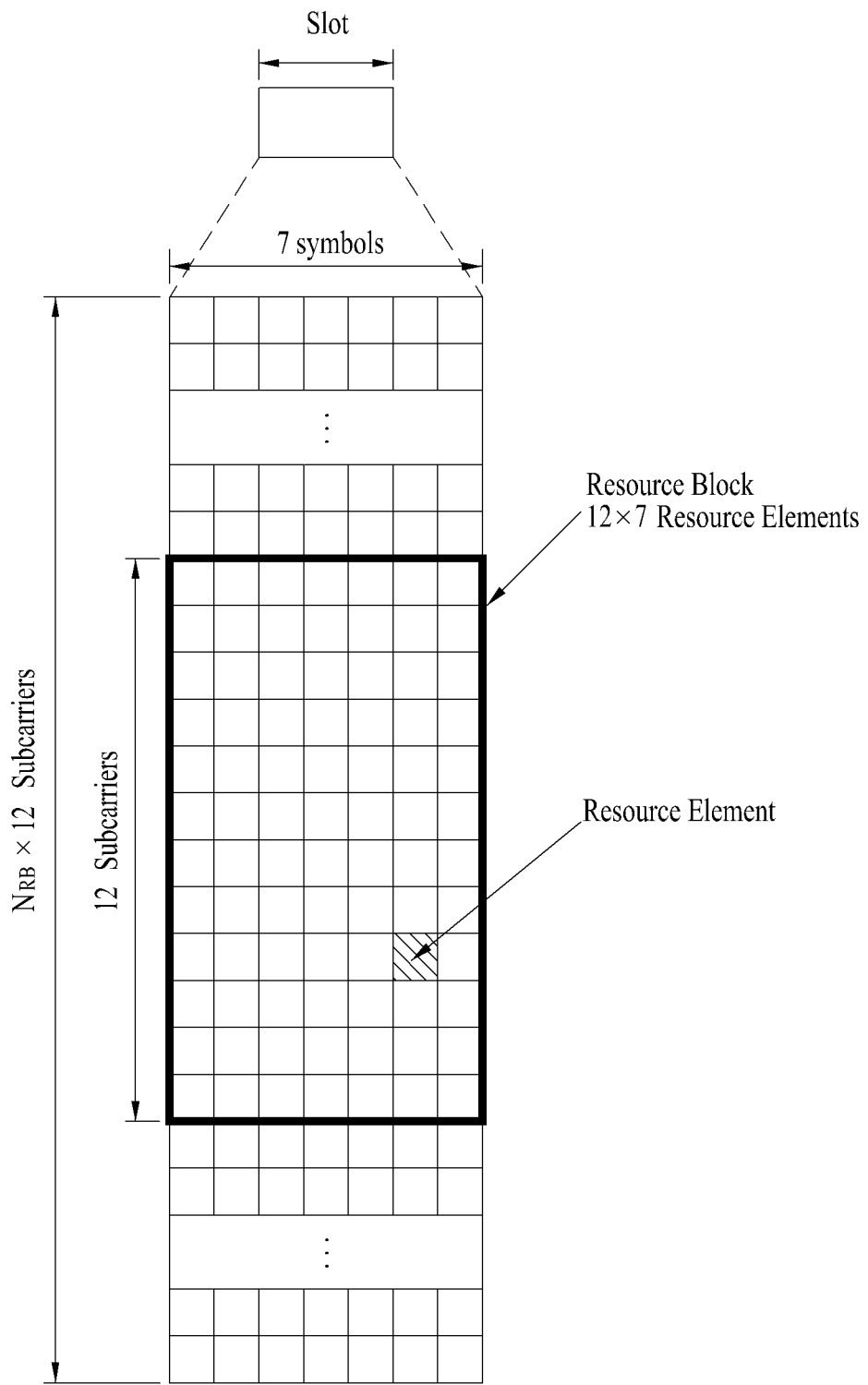
FIG. 2 illustrates a resource grid of one downlink slot.

FIG. 2 illustrates a resource grid of one downlink slot.

Referring to FIG. 2, a downlink slot includes a plurality of OFDM symbols in the time domain. One downlink slot may include 7 (or 6) OFDM symbols and one resource block (RB) may include 12 subcarriers in the frequency domain. Each element of the resource grid is referred to as a Resource Element (RE). An RB includes 12×7 (or 6) REs. The number of RBs in a downlink slot, $N_{DL}$ depends on a downlink transmission bandwidth. The structure of an uplink slot may have the same structure as a downlink slot in which OFDM symbols are replaced with SC-FDMA symbols.

Figure 3:
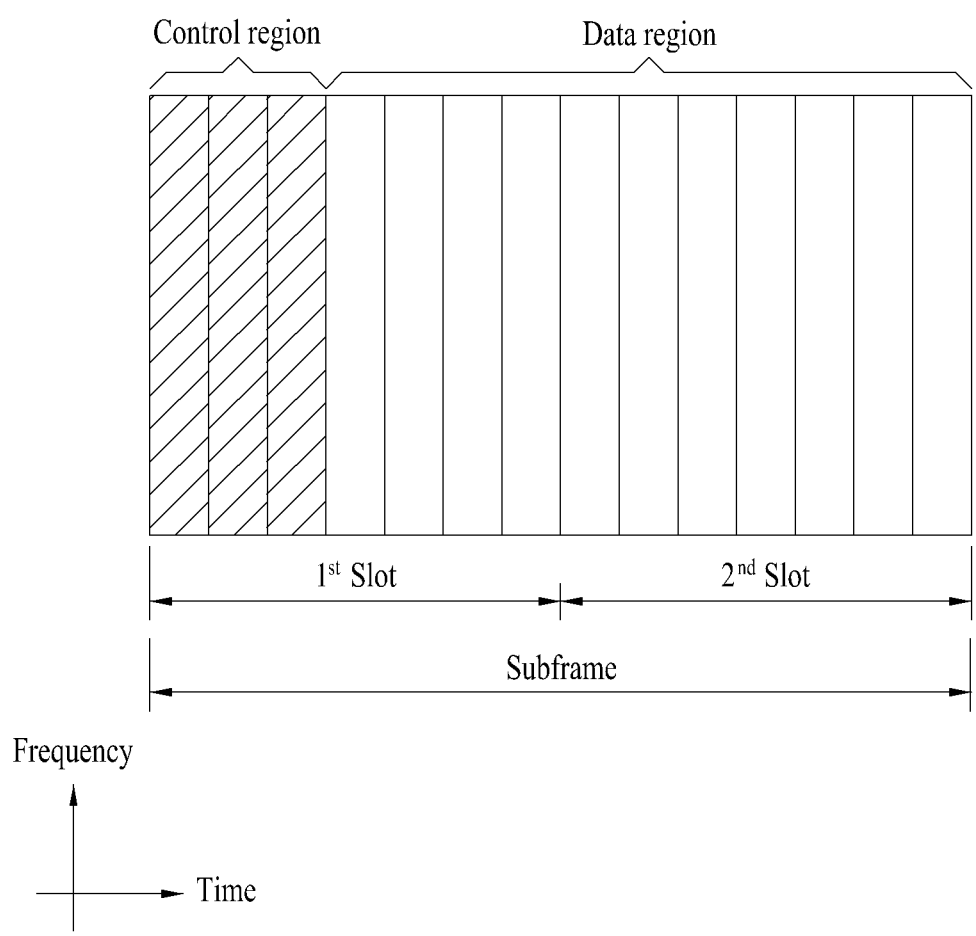
FIG. 3 illustrates a downlink subframe structure.

FIG. 3 illustrates a downlink subframe structure.

Referring to FIG. 3, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of physical downlink control channels used in the LTE(-A) system include a physical control format indicator channel (PCFICH), a physical downlink control channel (PDCCH), a physical hybrid ARQ indicator channel (PHICH), etc. PCFICH is transmitted at the first OFDM symbol of a subframe and carries information regarding the number of OFDM symbols used for transmission of control channels within the subframe. The PHICH carries a hybrid automatic repeat request (HARQ) acknowledgement/negative-acknowledgement (ACK/NACK) signal in response to an uplink transmission.

PDCCH carries a transmission format or resource allocation information of downlink shared channel (DL-SCH), a transmission format or resource allocation information of uplink shared channel (UL-SCH), paging information on paging channel (PCH), system information on DL-SCH, resource allocation information of an upper layer control message such as random access response transmitted on PDSCH, a set of Tx power control commands for individual UEs within a UE group, Tx power control command, activation indication information of Voice over IP (VoIP), etc. The PDCCH is allocated in the first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. For example, DCI format may selectively include exemplary fields shown in Table 3. In Table 3, a bit size of each information field is a non-limiting example.

TABLE 3

| Field | Bit(s) |
|---|---|
| Carrier indicator | 0 or 3 |
| Flag for determining DCI format 0/1A | 1 |
| Hopping flag | 1 |
| RB assignment | $\lceil \log_2(N_{RB}^{UL}(N_{RB}^{UL} + 1)/2) \rceil$ |
| MCS (Modulation and coding scheme) and RV (Redundancy Version) | 5 |
| NDI (New Data Indicator) | 1 |
| TPC (Transmit Power Control) command for scheduled PUSCH | 2 |
| Cyclic shift for DM RS | 3 |
| UL index (TDD) | 2 |
| CSI request | 1 or 2 |
| SRS request | 0 or 1 |

The carrier indicator field (CIF) may be referred to as carrier indication information in the present specification, and will be described in detail with reference to FIG. 7 and FIG. 8. The flag field is an information field for identifying between DCI format 0 and DCI format 1A. That is, DCI format 0 and DCI format 1A have the same payload size and are identified by the flag field. $N_{RB}^{UL}$ denotes the number of RBs included in an uplink slot and is determined according to an uplink transmission bandwidth configured in a cell.

The channel state information (CSI) request field is used for triggering aperiodic CSI reporting of a UE using PUSCH. If a DCI field including the CSI request field is mapped to UE-specific search space (USS), 2 bits may be allocated for the CSI request field, otherwise (e.g. a corresponding DCI field is mapped to common search space (CSS)) 1 bit may be allocated for the CSI request field. In the present specification, the CSI request field may be referred to as an aperiodic CSI (a-CSI) field.

The sounding reference signal (SRS) request field is used for triggering an SRS transmission of a UE. A sounding reference signal (SRS) may be transmitted by a UE to a base station for uplink scheduling. The base station may estimate an uplink channel or calculate a timing advance using the received sounding reference signal, and the base station uses the estimated uplink channel for uplink scheduling. The SRS request field may exist if a DCI format scheduling PUSCH is mapped to UE-specific search space, and 1 bit may be allocated for the SRS request field. Otherwise (e.g. a corresponding DCI field is mapped to common search space (CSS)), the SRS request field does not exist, and thus 0 bit is allocated for the SRS request field. SRS may be transmitted periodically or aperiodically. Aperiodical SRS transmission may be performed when triggered by the SRS request field. Thus, in the present specification, the SRS request field may be referred to as an aperiodic SRS (a-SRS) field.

A plurality of PDCCHs may be transmitted within one subframe. A UE may monitor the plurality of PDCCHs. PDCCH is transmitted on an aggregation of one or several consecutive control channel elements (CCEs). A CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. Each PDCCH is transmitted using one or more control channel elements (CCEs) and each CCE corresponds to 9 sets of 4 resource elements. The 4 resource elements are referred to as a resource element group (REG). 4 QPSK symbols are mapped to one REG. A resource element allocated to a reference signal is not included in an REG and thus a total number of REGs in a given OFDM symbol varies according to whether a cell-specific reference signal is present.

Table 4 exemplarily shows the number of CCEs, the number of REGs, and the number of PDCCH bits according to PDCCH format.

TABLE 4

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are consecutively numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. The limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, if a CRC error is not detected when the PDCCH is de-masked using the C-RNTI, the UE has detected its own PDCCH.

UE-specific search space (USS) is individually configured for each UE, and a range of common search space (CSS) is notified to all UEs. In the present specification, CSS may be referred to as a first search space, and USS may be referred to as a second search space. USS and CSS may be overlapped. In case of having very small search space, if some CCE positions are allocated to a search space for a specific UE, there is no remaining CCE. Thus, a base station may not find CCE resources for transmitting PDCCH to available UEs within a given subframe.

Table 5 shows sizes of CSS and USS.

TABLE 5

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To appropriately control computational load of blind decoding, the UE is not required to simultaneously search for all defined DCI formats. In general, the UE always searches for formats 0 and 1A in USS. Formats 0 and 1A have the same size and are discriminated from each other by a flag in a message. The UE may need to receive an additional format (e.g. format 1, 1B or 2 according to PDSCH transmission mode configured by a base station). The UE searches for formats 1A and 1C in CSS. Furthermore, the UE may be configured to search for format 3 or 3A. Formats 3 and 3A have the same size as that of formats 0 and 1A and may be discriminated from each other by scrambling CRC with different (common) identifiers rather than a UE-specific identifier. A PDSCH transmission scheme and information contents of DCI formats according to a transmission mode will be listed below.

Transmission Mode (TM)
Transmission Mode 1: Transmission from a single eNB antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Single-antenna port (port 5) transmission
Transmission Mode 8: Dual layer transmission (ports 7 and 8) or single-antenna port (port 7 or 8) transmission
Transmission Modes 9 and 10: Layer transmission up to rank 8 (ports 7 to 14) or single-antenna port (port 7 or 8) transmission
DCI Format
Format 0: Resource grant for PUSCH transmission (uplink)
Format 1: Resource allocation for single codeword PUSCH transmission (transmission modes 1, 2, and 7)
Format 1A: Compact signaling of resource allocation for single codeword PDSCH transmission (all modes)
Format 1B: Compact resource allocation for PDSCH (mode 6) using rank-1 closed-loop precoding
Format 1C: Very compact resource allocation for PDSCH (e.g., paging/broadcast system information)
Format 1D: Compact resource allocation for PDSCH (mode 5) using multi-user MIMO
Format 2: Resource allocation for PDSCH (mode 4) of closed-loop MIMO operation
Format 2A: Resource allocation for PDSCH (mode 3) of open-loop MIMO operation
Format 3/3A: Power control command with 2-bit/1-bit power adjustments for PUCCH and PUSCH
Format 4: Resource grant for PUSCH transmission (uplink) in a cell configured in a multi-antenna port transmission mode A UE may be semi-statically configured via higher layer signaling to receive PDSCH data transmission that is scheduled by the PDCCH according to 10 transmission modes.

Figure 4:
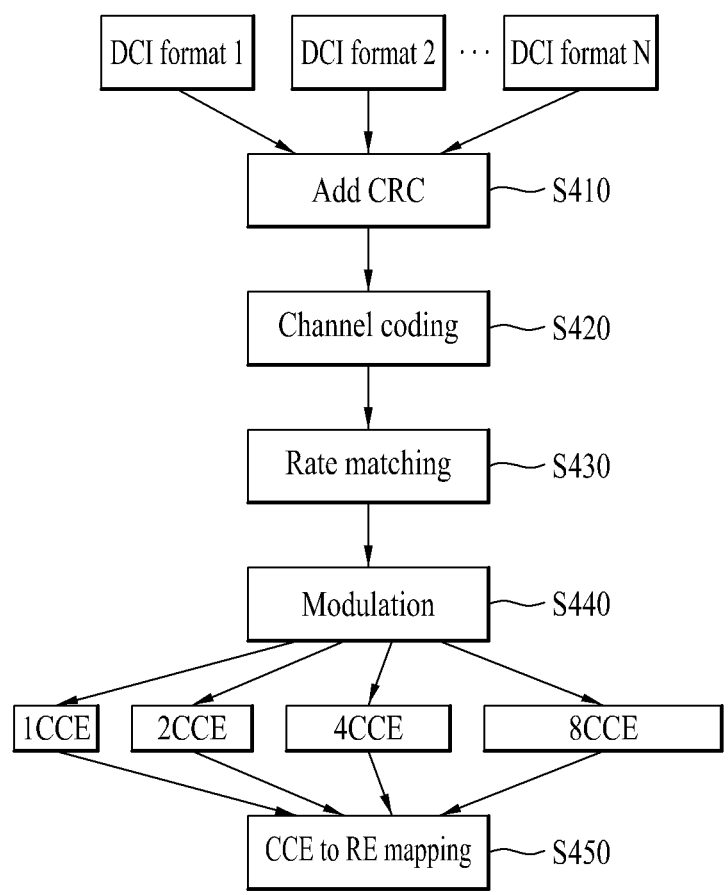
FIG. 4 is a flowchart illustrating a method for constructing a PDCCH by a base station.

FIG. 4 is a flowchart illustrating a method for constructing a PDCCH by a base station.

Referring to FIG. 4, the base station generates control information according to a DCI format. The base station may select one of a plurality of DCI formats (i.e., DCI formats 1, 2, . . . , N) according to types of control information to be transmitted to the UE. In step S410, the base station attaches a cyclic redundancy check (CRC) for error detection to control information that is generated according to each DCI format. The CRC is masked with a Radio Network Temporary Identifier (RNTI) according to an owner or usage of the PDCCH. In other words, the PDCCH is CRC-scrambled with an identifier (e.g., RNTI).

Table 6 shows examples of identifiers masked to the PDCCH.

TABLE 6

| Type | Identifier | Description |
| --- | --- | --- |
| UE-specific | C-RNTI, temporary C-RNTI, semi-persistent C-RNTI | Used for unique identification of UE |
| Common | P-RNTI SI-RNTI RA-RNTI | Used for paging message Used for system information Used for random access response |

For example, if the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. If C-RNTI, temporary C-RNTI, or semi-persistent C-RNTI is used, PDCCH carries control information for a specific UE. If RNTI other than RNTI, temporary C-RNTI, or semi-persistent C-RNTI is used, PDCCH carries common control information received by all UEs within a cell.

In step S420, the control information to which the CRC is attached is subjected to channel coding so as to generate coded data. In step S430, rate matching according to a CCE aggregation level allocated to a PDCCH format is performed. In step S440, the coded data is modulated so as to generate modulated symbols. The modulated symbols configuring one PDCCH may have one of CCE aggregation levels of 1, 2, 4 and 8. In step S450, the modulated symbols (CCEs) are mapped to REs.

Figure 5:
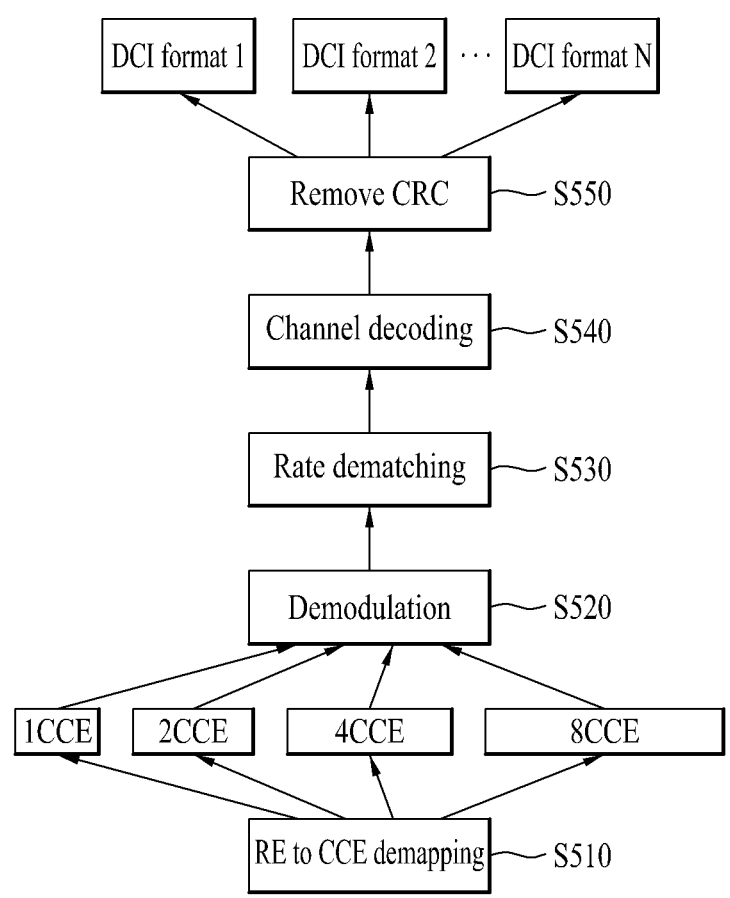
FIG. 5 illustrates a processing procedure for receiving a PDCCH by a UE.

FIG. 5 illustrates a processing procedure for receiving a PDCCH by a UE.

Referring to FIG. 5, in step S510, the UE demaps physical REs to CCEs. In step S520, since the UE is not aware of a CCE aggregation level, at which the UE receives a PDCCH, demodulation is performed with respect to the CCE aggregation levels. In step S530, the UE performs rate dematching with respect to the demodulated data. Since the UE is not aware of a DCI format (or a DCI payload size) of control information to be received, rate dematching is performed with respect to each DCI format (or each DCI payload size). In step S540, the data subjected to rate dematching is subjected to channel decoding according to a code rate and a CRC is checked to detect whether errors occur. If errors do not occur, it is determined that the UE detects a PDCCH thereof. If errors occur, the UE continues to perform BD with respect to other CCE aggregation levels or other DCI formats (or DCI payload sizes). In step S550, the UE which detects the PDCCH removes the CRC from the decoded data and acquires control information.

Figure 6:
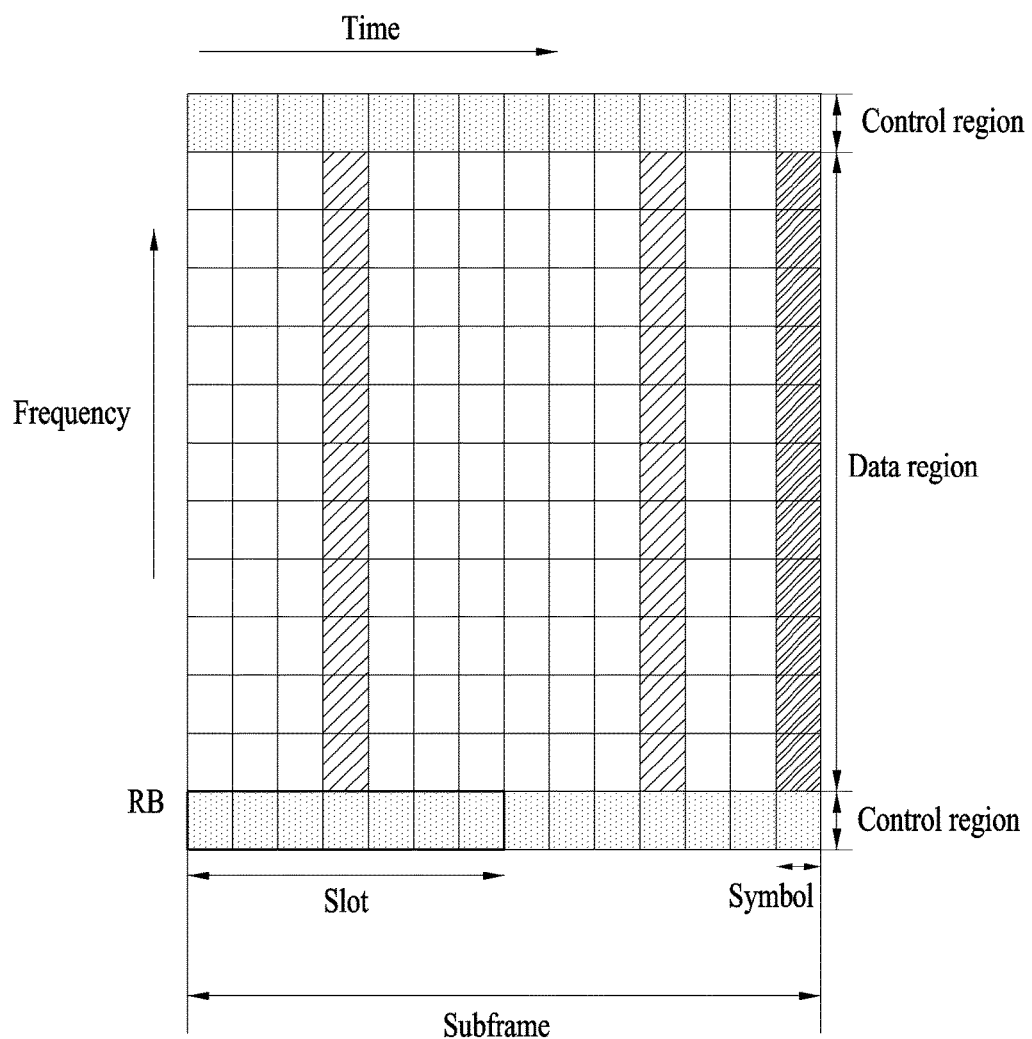
FIG. 6 illustrates a structure of an uplink subframe.

FIG. 6 illustrates a structure of an uplink subframe.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in the frequency domain. The data region includes a PUSCH, and is used to transmit a data signal that includes voice information. The control region includes a PUCCH, and is used to transmit control information. The PUCCH includes RB pair (e.g. m=0, 1, 2, 3) located at both ends of the data region on a frequency axis, and performs hopping on the border of the slots. The control information includes HARQ ACK/NACK, CQI (Channel Quality Indicator), a precoding matrix indicator (PMI), a rank indicator (RI), etc.

Demodulation reference signal may be combined with a PUSCH or PUCCH transmission, and may be transmitted by a UE to a base station for demodulation of an uplink signal. Sounding reference signal may be transmitted at the last symbol of a subframe, and is not combined with a PUSCH or PUCCH transmission.

Figure 7:
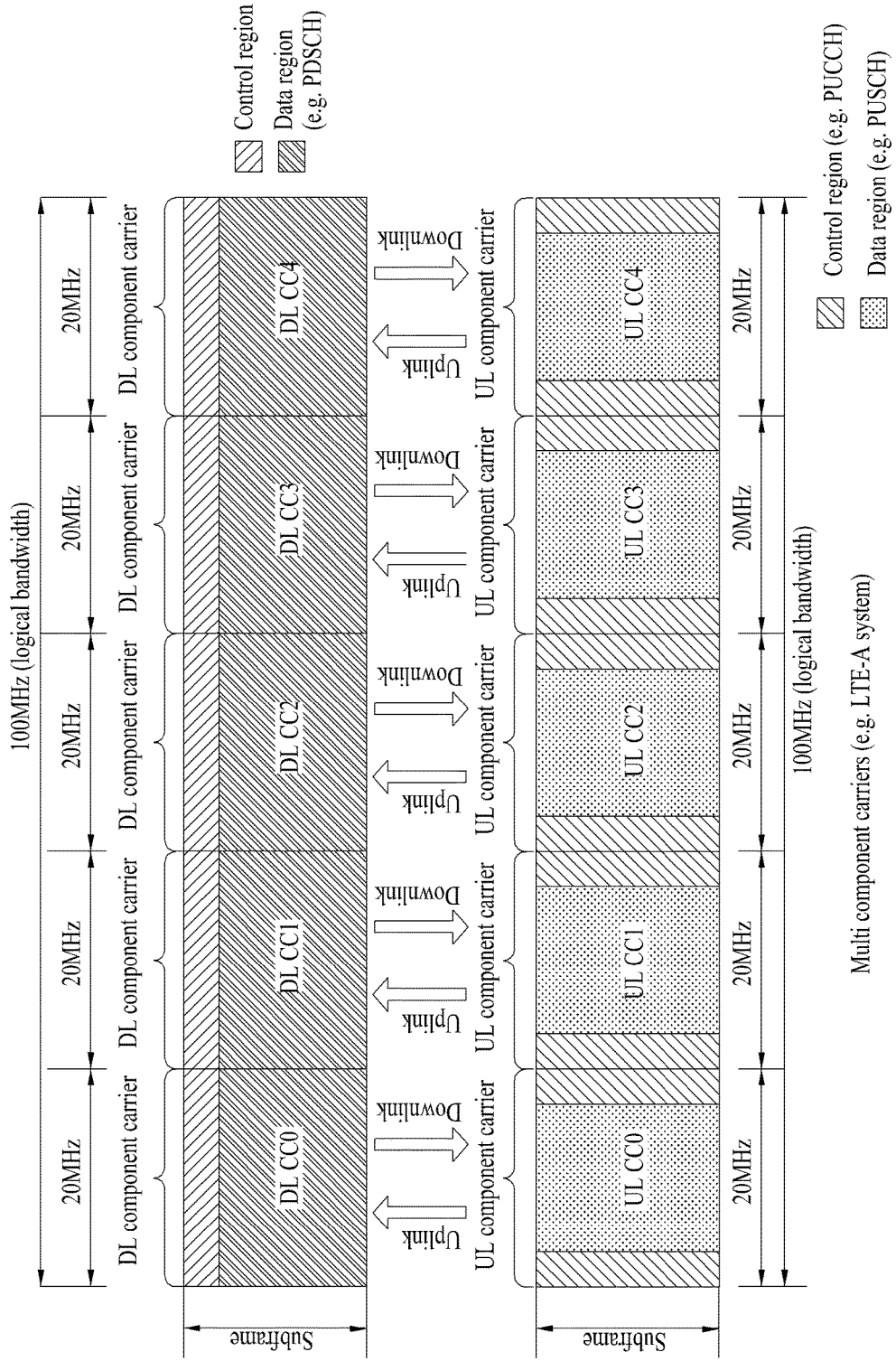
FIG. 7 illustrates a carrier aggregation (CA) communication system.

FIG. 7 illustrates a carrier aggregation (CA) communication system.

Referring to FIG. 7, a wider UL/DL bandwidth may be supported in a manner of aggregating a plurality of UL/DL component carriers (CCs). A technology of aggregating and using a plurality of the component carriers is referred to as a carrier aggregation or bandwidth aggregation. A component carrier may be comprehended as a carrier frequency (or center carrier, center frequency) for a corresponding frequency block. Respective component carriers may be adjacent or non-adjacent to each other in frequency domain. A bandwidth of each component carrier may be independently determined. It may configure an asymmetrical carrier aggregation in which the number of UL CCs is different from the number of DL CCs. For instance, there are 2 DL CCs and 1 UL CC, asymmetrical carrier aggregation can be configured in a manner that the DL CC corresponds to the UL CC by 2:1. A link between a DL CC and an UL CC is fixed in a system or can be semi-statically configured. Although a whole system band consists of N number of CCs, a frequency band capable of being monitored/received by a specific user equipment can be restricted to M (≤N) number of CCs. Various parameters for carrier aggregation can be configured by a cell-specific, a UE group-specific or a UE-specific scheme.

Meanwhile, control information may be configured to be transmitted and received on a specific CC only. Such specific CC is referred to as a primary CC (PCC) and the rest of CCs are referred to a secondary CC (SCC). The PCC may be used for a user equipment to perform an initial connection establishment process or a connection re-establishment process. The PCC may refer to a cell indicated in a handover procedure. The SCC may be configured after an RRC connection is established and may be used to provide an additional radio resource. As an example, scheduling information may be configured to be transceived via a specific CC only. Such a scheduling scheme is called cross-carrier scheduling (or cross-CC scheduling). If the cross-CC scheduling is applied, PDCCH for DL assignment is transmitted on a DL CC #0 and corresponding PDSCH can be transmitted on a DL CC #2. The term 'component carrier' may be replaced with a different equivalent terminology such as a carrier, a cell or the like. For example, PCC and SCC may be interchangeably used with PCell and SCell, respectively.

For cross-CC scheduling, a carrier indicator field (CIF) may be used. In the present specification, the carrier indicator field may be referred to as carrier indicator information or carrier indication information. If cross-CC scheduling is configured, grant information (e.g. PDCCH) may include CIF. If cross-CC scheduling is not configured, grant information (e.g. PDCCH) may not include CIF. Thus, the case that CIF is included in PDCCH may be equivalent to the case of cross-CC scheduling being configured, and the case that CIF is not included in PDCCH may be equivalent to the case of cross-CC scheduling not being configured. Whether CIF is included in PDCCH or not may be configured in a semi-static manner through a higher layer signaling (e.g. RRC signaling) or in a UE-specific (or UE group-specific) manner. The basic matters (baselines) of PDCCH transmission are summarized as follows.

CIF disabled: PDCCH on a DL CC allocates PDSCH resources on the same DL CC or PUSCH resources on a single linked UL CC.
No CIF, that is, 0-bit field
Identical to LTE PDCCH structure (same coding, same CCE-based resource mapping) and DCI format CIF enabled: PDCCH on a DL CC may allocate PDSCH or PUSCH resources on a specific DL/UL CC of a plurality of aggregated DL/UL CCs using a CIF.
Extended LTE DCI format having a CIF
CIF (if configured) is a fixed x-bit field (e.g., x=3)
The position of the CIF (if configured) may be fixed regardless of a DCI format size.
LTE PDCCH structure is reused (same coding, same CCE-based resource mapping)

If CIF is present, a base station may allocate a PDCCH monitoring DL CC set in order to reduce complexity of blind decoding (BD) at a UE. A PDCCH monitoring DL CC set is a part of all the aggregated DL CCs and includes one or more DL CCs, and a UE may detect/decode a PDCCH only in a corresponding DL CC. In other words, if the base station performs PDSCH/PUSCH scheduling, the PDCCH is transmitted only through the PDCCH monitoring DL CC set. The PDCCH monitoring DL CC set may be configured in a UE-specific, UE-group-specific or cell-specific manner. The term "PDCCH monitoring DL CC" may be replaced with equivalent terms "monitoring carrier", "monitoring cell", etc. In addition, the term "aggregated CC" for a UE may be replaced with terms such as "serving CC", "serving carrier", "serving cell", etc.

Figure 8:
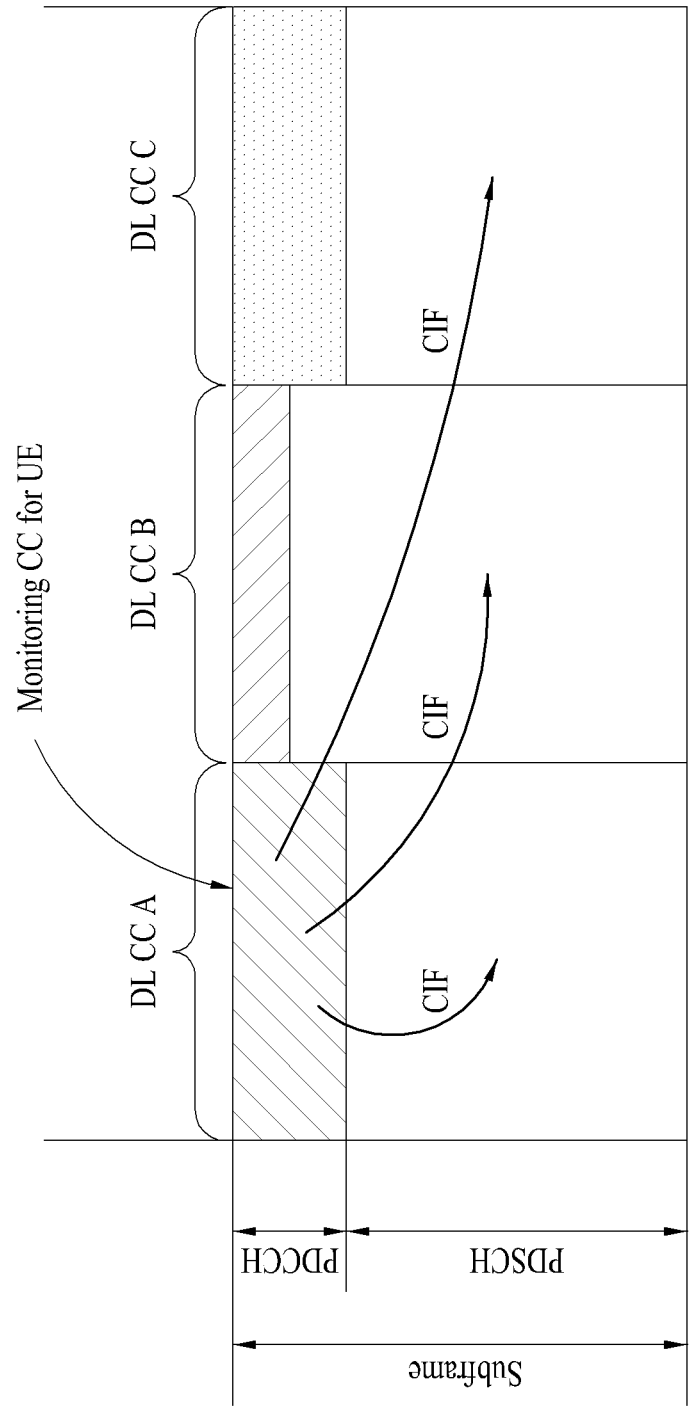
FIG. 8 illustrates scheduling when a plurality of carriers is aggregated.

FIG. 8 illustrates scheduling when a plurality of carriers is aggregated. It is assumed that 3 DL CCs are aggregated and DL CC A is configured as a PDCCH monitoring DL CC. DL CC A, DL CC B and DL CC C may be called serving CCs, serving carriers, serving cells, etc. In case of CIF disabled, each DL CC may transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) may transmit not only a PDCCH that schedules the PDSCH corresponding to the DL CC A but also PDCCHs that schedule PDSCHs of other DL CCs. In this case, no PDCCH is transmitted in DL CC B and DL CC C not configured as PDCCH monitoring DL CCs. Therefore, DL CC A (monitoring DL CC) must include all of a PDCCH search space related to DL CC A, a PDCCH search space related to DL CC B, and a PDCCH search space related to DL CC C. In the present specification, it is assumed that the PDCCH search space is defined per carrier.

Whether CIF is used (i.e., support of a cross-CC scheduling mode or a non-cross-CC scheduling mode) and switching between modes may be semi-statically or UE-specifically configured through RRC signaling. After performing the corresponding RRC signaling procedure, a UE may recognize whether CIF is used in a PDCCH to be scheduled in the UE.

Figure 9:
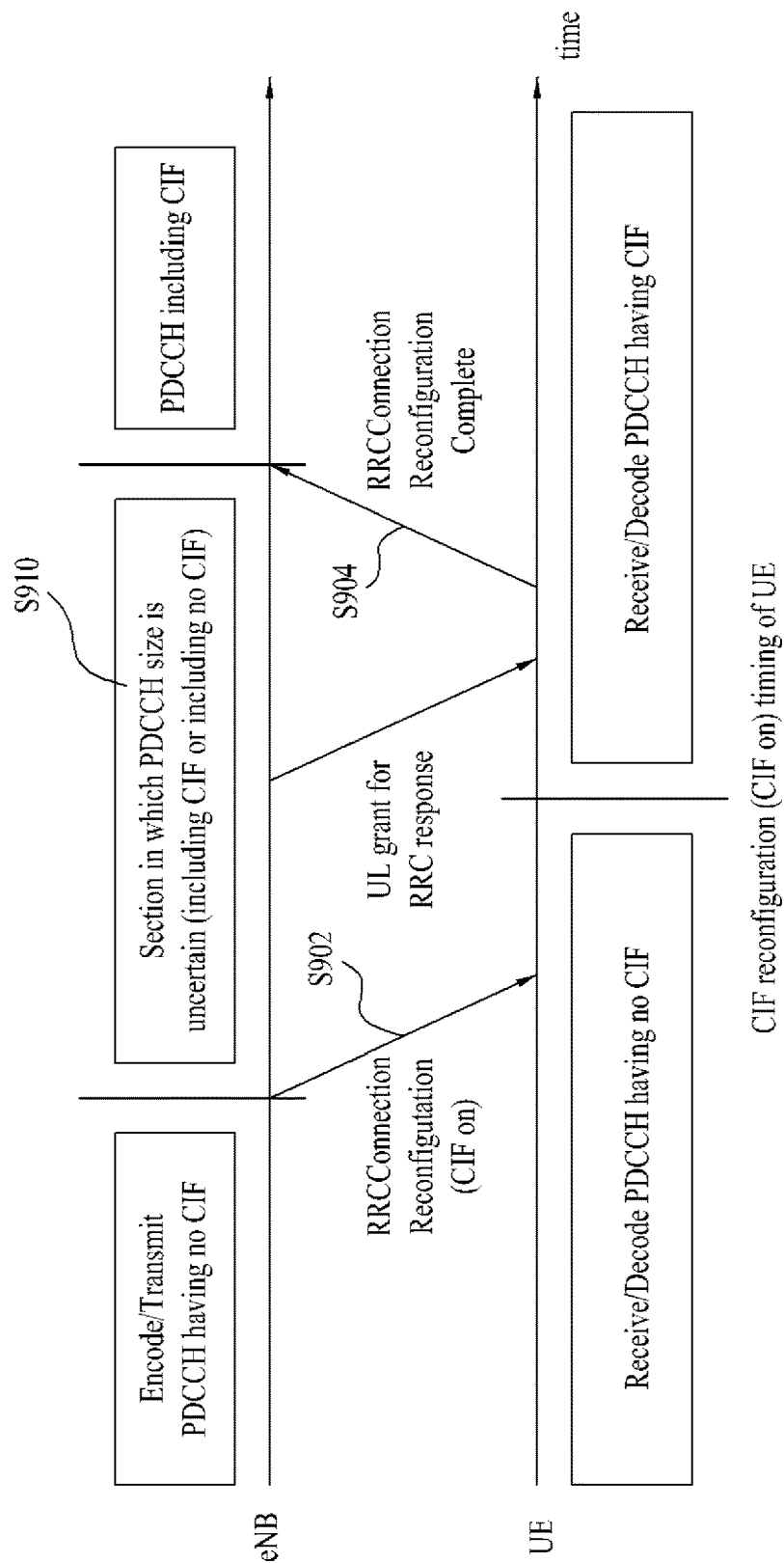
FIG. 9 illustrates operations of a base station and a UE during RRC reconfiguration.

FIG. 9 illustrates operations of a base station and a UE during RRC reconfiguration. As a non-liming example, FIG. 9 assumes a reconfiguration situation in which a CIF unused status (i.e. CIF OFF) is reconfigured to a CIF used status (i.e. CIF ON).

Referring to FIG. 9, a base station transmits an RRC command (e.g., "RRCConnectionReconfiguration" command) to the UE, wherein the RRC command is for configuring usage of CIF within PDCCH for a corresponding UE, i.e. for delivering a CIF reconfiguration message (S902). The UE delivers the received RRC command to a RRC layer of itself. The RRC layer of the UE an RRC response (e.g. "RRC RRCConnectionReconfigurationComplete" message" to the base station in response to the RRC command received from the base station, wherein the RRC response is for delivering a CIF reconfiguration complete message (S904).

Meanwhile, in the RRC signaling interval 910, since a start time for applying CIF reconfiguration (i.e., CIF on/off) may be different between the base station and the UE, there is a possibility of an error in the base station transmitting PDCCH transmission and in the UE reception/decoding procedure of the PDCCH. In other words, there is a possibility that the base station and the UE mat differently recognize whether CIF is used for the same PDCCH at a specific time of the RRC signaling interval 910. For example, the base station may transmit a PDCCH without using the CIF, while the UE may receive/decode the corresponding PDCCH using the CIF. In addition, the base station transmits a PDCCH after inserting the CIF, and the UE may receive/decode the corresponding PDCCH without using the CIF. Such an error may cause unnecessary overhead in PDCCH transmission/reception between the eNB and the UE, and may also increase a scheduling time delay.

Meanwhile, Rel-10/11-based LTE-A system introduces carrier aggregation (CA) configuration and cross-CC scheduling, transmission mode (TM) 10-based coordinated multipoint (CoMP) operation and so on. The CoMP operation refers to a communication scheme for transmitting/receiving a signal using a plurality of transmit (Tx) or receive (Rx) nodes, a communication scheme for transmitting/receiving a signal through at least one node selected from a plurality of Tx/Rx nodes, or a communication scheme for differently configuring nodes for transmitting a downlink signal and receiving an uplink signal. Accordingly, in the case of specific DCI format (e.g., 1A), an entire payload size is configured to be the same between a common search space (CSS) and a UE-specific search space (USS), whereas types and sizes of fields (e.g., carrier indicator field (CIF), aperiodic SRS request field (a-SRS), and aperiodic CSI request field (a-CSI)) included in the corresponding DCI format may be differently configured between a CSS and a USS. In this case, the CSS and the USS may overlap during PDCCH transmission/detection, and thus ambiguity/misalignment (in terms of recognition/interpretation of a DCI field) between a base station and a UE may be caused with respect to a PDCCH candidate detected through an SS overlap region.

In order to prevent this problem, a method for differently determining which SS a PDCCH candidate detected through the SS overlap region is associated with according to whether a CIF in a PDCCH is configured may be considered and may be referred to as a "CIF-dependent handling" method. In more detail, the CIF-dependent handling method may differently perform interpretation, for example, when a CIF is configured for a PDCCH transmitted through a USS on a Pcell (or when cross carrier scheduling is configured), the corresponding detected PDCCH candidate is associated with a CSS, and when the CIF is not configured (or when cross carrier scheduling is not configured), the corresponding detected PDCCH candidate is associated with a USS. Alternatively, in the CIF-dependent handling method, when a CSS and a USS overlap with each other, if a CIF is configured (or if cross carrier scheduling is configured), the CSS may be prioritized, and if the CIF is not configured (or if cross carrier scheduling is not configured), the USS may be prioritized.

The reason for considering the "CIF-dependent handling" method with respect to an SS overlap situation may be described as follows. First, in the case of SS overlap when a CIF is configured (or when cross carrier scheduling is configured), overlap may occur between a PDCCH candidate of a CSS without a CIF and a PDCCH candidate of a USS with a CIF. In this case, in order to prevent a faulty operation of a UE (e.g., refer to FIG. 9) in a RRC reconfiguration period associated with carrier aggregation (CA), a CIF, a transmission mode (TM), and so on, CSS prioritization may be more stable.

On the other hand, in the case of SS overlap when a CIF is not configured (or when cross carrier scheduling is not configured), (if there is no CIF in both SSs) overlap between a PDCCH candidate of a CSS having 1-bit a-CSI and 0-bit a-SRS and a PDCCH candidate of a USS having 2-bit a-CSI and/or 1-bit a-SRS may occur. In this case, the USS may be prioritized to enhance availability for an a-CSI/a-SRS function, and handling of the SS overlap in an RRC reconfiguration period may be overcome via appropriate bit setting (that is, the same result is achieved even if interpreted as being associated with any SS of the two SSs) that does not cause a faulty operation of the UE.

Figure 10:
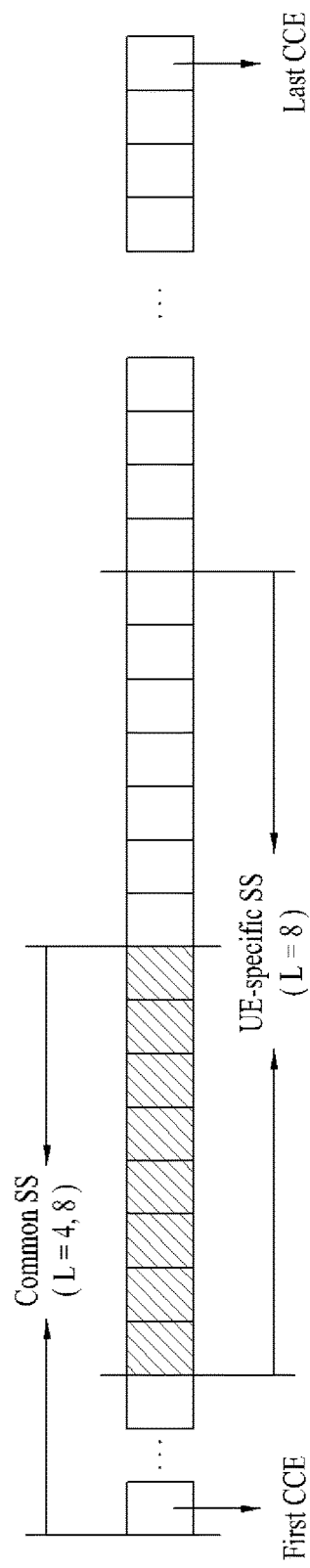
FIG. 10 illustrates a situation of overlap between a CSS and a USS.

FIG. 10 illustrates a situation of overlap between a CSS and a USS.

In the example of FIG. 10, one rectangular block indicates one CCE. In addition, as an unlimited example, a CSS may be configured to have a specific CCE aggregation level (e.g., 4 or 8) among four CCE aggregation levels (e.g., 1, 2, 4, and 8) and a USS may be configured to have a specific CCE aggregation level (e.g., 8) among four CCE aggregation levels. In addition, the CSS and the USS may overlap with each other and an overlap region between the SSs may be denoted by oblique lines, and the exemplified CSS and USS may exist on a PCell.

Referring to FIG. 10, a PDCCH candidate configured with a specific CCE aggregation level (e.g., 8) may be detected in an SS overlap region. In this case, the detected PDCCH candidate may belong to the CSS and may also belong to the USS, thereby causing ambiguity/faulty operation in a UE. In the CIF-dependent handling method, when a CIF is configured (or when cross carrier scheduling is configured), the detected PDCCH candidate may be processed as being associated with the CSS, and when the CIF is not configured (or when cross carrier scheduling is not configured), the detected PDCCH candidate may be processed as being associated with the USS. Alternatively, in the CIF-dependent handling method, when a CIF is configured (or when cross carrier scheduling is configured), the corresponding PDCCH candidate may be interpreted as being detected through the CSS by prioritizing the CSS, and when the CIF is not configured (or when cross carrier scheduling is not configured), the corresponding PDCCH candidate may be interpreted as being detected through the USS by prioritizing the USS.

Figure 11:
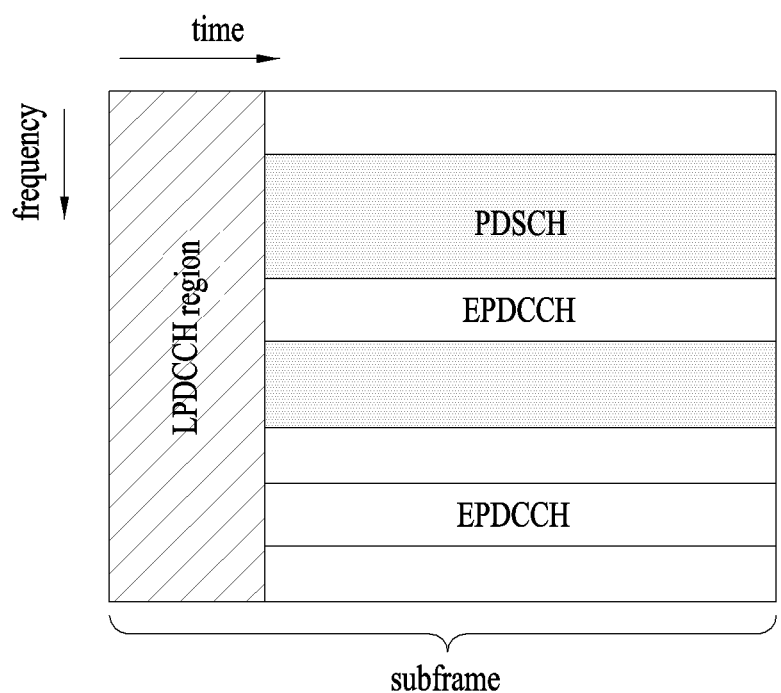
FIG. 11 illustrates an example of allocation of an EPDCCH in a subframe.

FIG. 11 illustrates an example of allocation of an EPDCCH in a subframe. A system beyond 3GPP LTE-A Rel-11 has introduced a enhanced PDCCH (EPDCCH) based on UE-specific DMRS in order to enhance performance and efficiency of a control channel.

Referring to FIG. 11, a PDCCH (for convenience, Legacy PDCCH (LPDCCH)) used in a legacy LTE(-A) system may be allocated to a control region (refer to FIG. 3) in a subframe. In the figure, the LPDCCH region may refer to a region to which a legacy PDCCH can be allocated. According to the context, the LPDCCH region may refer to a control region, a control channel resource region (that is, a CCE resource) to which a PDCCH can be actually allocated within a control region, or a PDCCH search space. A PDCCH may be additionally allocated within a data region (e.g., a resource region for a PDSCH, refer to FIG. 3). A PDCCH allocated to a data region may be referred to as an EPDCCH. As illustrated, a control channel resource may be additionally ensured through an EPDCCH so as to mitigate scheduling restriction caused by a limited control channel resource in a LPDCCH region. In the specification, the LPDCCH may be referred to as a first type PDCCH and an EPDCCH may be referred to as a second type PDCCH. Alternatively, a PDCCH allocated to a control region of a subframe may be simply referred to as a PDCCH, and a PDCCH allocated to a data region of a subframe may be referred to as EPDCCH.

In detail, the EPDCCH may be detected/demodulated based on DM-RS. The EPDCCH may be configured to be transmitted over a PRB pair (including a legacy PDSCH region) on a time axis. In more detail, a search space (SS) for EPDCCH detection may be configured with one or more (e.g., 2) EPDCCH sets, and each EPDCCH set may occupy a plurality of (e.g., 2, 4, and 8) PRB pairs. In addition, an ECCE included in each EPDCCH set may be mapped in the localized or distributed form (according to whether one ECCE is distributed across a plurality of PRB pairs). In addition, when EPDCCH-based scheduling is configured, a subframe in which EPDCCH transmission/detection is to be performed may be designated, and the EPDCCH may be configured only in an USS. Accordingly, the UE may attempt to detect DCI with respect to only a PDCCH CSS and an EPDCCH USS in a subframe (EPDCCH subframe) in which EPDCCH transmission/detection is configured, and may attempt to detect DCI with respect to only a PDCCH CSS and a PDCCH USS in a subframe (non-EPDCCH subframe) in which EPDCCH transmission/detection is not configured. In the specification, a subframe in which EPDCCH transmission/detection (or monitoring) is configured may be referred to as an EPDCCH subframe, and a subframe in which EPDCCH transmission/detection (or monitoring) is not configured may be referred to as a non-EPDCCH subframe.

When EPDCCH-based scheduling is configured, transmission regions of a PDCCH and an EPDCCH may be physically separated. Accordingly, overlap between a PDCCH CSS and an EPDCCH USS may not occur. In at least EPDCCH subframe, an (EPDCCH) USS may not be overlapped with a (PDCCH) CSS, and thus there is a restriction from the perspective of utilization of a-CSI/a-SRS function. The problem is a (PDCCH) CSS in an EPDCCH subframe, in this case a system bandwidth (BW) of a Pcell is small or a small CCE resource on a Pcell is configured so that a PDCCH CSS (or CCEs included therein) and a PDCCH USS (or CCEs included therein) may fully overlap with each other (that is, full overlap). In this situation, when the "CIF-dependent handling" method is applied without changes, DCI transmission/detection may be permitted through only a PDCCH CSS and an EPDCCH USS in an EPDCCH subframe, and thus, when a CIF is configured (or when cross carrier scheduling is configured), a PDCCH candidate associated with a CSS can be transmitted/detected in the SS overlap region. On the other hand, when a CIF is not configured (or when cross carrier scheduling is not configured), DCI detection may be attempted through an EPDCCH USS, and thus transmission/detection may not be defined/performed on any PDCCH candidate in the SS overlap region.

Accordingly, the present invention proposes a PDCCH transmission method for the case that SS overlap occurs between a PDCCH CSS and a PDCCH USS if EPDCCH-based scheduling is configured. In the specification, the case in which EPDCCH-based scheduling is configured may refer to the case in which information for EPDCCH configuration is received via a higher layer (e.g., RRC). In the present invention, the "PDCCH candidate detected through the SS overlap region" may refer to a PDCCH candidate in which CRC scrambling RNTI (e.g., C-RNTI or SPS C-RNTI), an entire DCI payload size, the first CCE index (or lowest CCE index), and so on are configured to be the same between a PDCCH CSS and a PDCCH USS for a specific DCI format (e.g., 1A) associated with both the PDCCH CSS and PDCCH but types and sizes of fields included in the corresponding DCI format are differently configured between the two SSs.

Method 1: CSS Prioritization if Configured with EPDCCH

According to this method, when EPDCCH-based scheduling is configured, a CSS may always be prioritized in the case of overlap between PDCCH SSs. Alternatively, when EPDCCH-based scheduling is configured, a corresponding PDCCH candidate detected through the SS overlap region may be considered to be associated with a CSS. In other words, when EPDCCH-based scheduling is configured, a CSS may always be prioritized in the case of overlap between PDCCH SSs irrespective of subframe configuration (irrespective of an EPDCCH subframe or a non-EPDCCH subframe).

Method 2: CSS Prioritization in EPDCCH Subframe

According to this method, a CSS may always be prioritized in the case of overlap between PDCCH SSs in an EPDCCH subframe. Alternatively, when overlap between PDCCH SSs occurs in an EPDCCH subframe, a corresponding PDCCH candidate detected through an SS overlap region may be considered to be associated with the CSS. When overlap between PDCCH SSs occurs in a non-EPDCCH subframe, the "CIF-dependent handling" method may be applied without changes.

As another method, a UE may operate under consideration/assumption that a PDCCH USS is not present (or not configured/transmitted) in an EPDCCH subframe. Alternatively, the UE may operate under consideration/assumption that only a CSS is present (or configured/transmitted) for a PDCCH in an EPDCCH subframe.

Method 3: Allow PDCCH USS in EPDCCH Subframe

According to this method, in the case that overlap occurs between PDCCH SSs in an EPDCCH subframe (when a CIF is not configured or cross carrier scheduling is not configured), PDCCH candidate transmission/detection associated with a PDCCH USS may be allowed through the corresponding SS overlap region. With respect to the other case (a non-EPDCCH subframe and/or an EPDCCH subframe in which a CIF is configured or cross carrier scheduling is configured), the "CIF-dependent handling" method may be applied without changes.

Each of the above proposed methods may be combined to construct a new method as necessary. Alternatively, each method may be implemented by excluding some features from the method.

FIG. 12 illustrates a flowchart of a control channel transmitting and receiving method according to an embodiment of the present invention. FIG. 12(A) illustrates an exemplary embodiment according to Method 1, and FIG. 12(B) illustrates an exemplary embodiment according to Method 2.

In the example of FIG. 12, a UE may detect a first type control channel (e.g., a PDCCH) in a control region of a specific subframe. In this case, a first SS (e.g., a CSS) and a second SS (e.g., a USS) may overlap with each other, and the first type control channel (e.g., a PDCCH) may be detected in the SS overlap region between the first SS and the second SS. In this case, the methods (Methods 1 to 3) according to the present invention may be applied in order to determine an SS associated with the detected first type control channel (e.g., a PDCCH) (or DCI included therein).

Referring to FIG. 12(A), when a UE is configured with EPDCCH-based scheduling, a first type control channel (e.g., a PDCCH) detected in the SS overlap region may be determined to be associated with a first SS (e.g., a CSS). Alternatively, when the UE is configured to perform EPDCCH detection, a PDCCH detected in the SS overlap region may be determined to be associated with the first SS (e.g., a CSS).

Referring to FIG. 12(B), when overlap between PDCCH SSs occurs in an EPDCCH subframe, a PDCCH detected in the SS overlap region may be determined to be associated with the first SS (e.g., a CSS). Alternatively, when the UE detects or receives an EPDCCH in the specific subframe, a PDCCH detected in the SS overlap region may be determined to be associated with the first SS (e.g., a CSS).

According to the above embodiment or another embodiment of the present invention, the proposed methods according to the present invention (Methods 1 to 3) may be applied only to the case in which EPDCCH-based scheduling is configured and a PDCCH CSS and a PDCCH USS fully overlap (that is, full overlap). Alternatively, the proposed methods according to the present invention (Methods 1 to 3) may be applied only to the case in which a PDCCH CSS and a PDCCH USS fully overlap (that is, full overlap) in an EPDCCH subframe (in which a CIF is not configured or cross carrier scheduling is not configured). Under the above condition (e.g., when EPDCCH-based scheduling is configured or in an EPDCCH subframe (in which a CIF is not configured or cross carrier scheduling is not configured), the "CIF-dependent handling" method may be applied without changes to the case in which SSs fully overlap (that is, full overlap) and/or the rest of the case.

As another method, in an EPDCCH subframe (in which a CIF is not configured or cross carrier scheduling is not configured), when overlap between PDCCH SSs occurs, detection of PDCCH candidate (associated with a CSS) may be attempted/allowed through only a CSS region that does not belong to the corresponding SS overlap. Alternatively, detection of a PDCCH candidate that belongs to the corresponding SS overlap region may not be attempted/allowed or disregarded.

All the proposed methods may be restrictedly applied only to the case in which a CIF is not configured or cross carrier scheduling is not configured, and otherwise (that is, when a CIF is configured or cross carrier scheduling is configured), the "CIF-dependent handling" method may be applied without changes.

Figure 13:
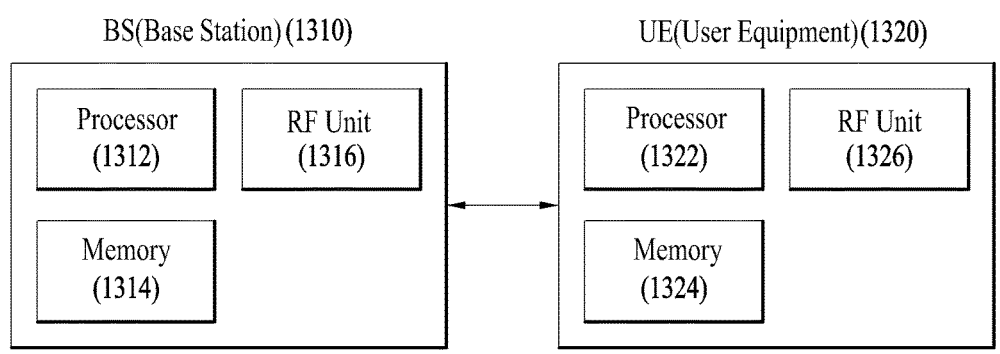
FIG. 13 illustrates a base station and a user equipment to which the present invention is applicable.

FIG. 13 illustrates a base station and a user equipment to which the present invention is applicable.

Referring to FIG. 13, a wireless communication system includes the BS 1310 and the UE 1320. When the wireless communication system includes a relay, the BS 1310 or the UE 1320 may be replaced with the relay.

The BS 1310 includes a processor 1312, a memory 1314, and a radio frequency (RF) unit 1316. The processor 1312 may be configured to embody the procedures and/or methods proposed by the present invention. The memory 1314 is connected to the processor 1312 and stores various pieces of information associated with an operation of the processor 1312. The RF unit 1316 is connected to the processor 1312 and transmits/receives a radio signal. The UE 1320 includes a process 1322, a memory 1324, and an RF unit 1326. The processor 1322 may be configured to embody the procedures and/or methods proposed by the present invention. The memory 1324 is connected to the processor 1322 and stores various pieces of information associated with an operation of the processor 1322. The RF unit 1326 is connected to the processor 1322 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station" may be replaced with the term "fixed station", "Node B", "eNode B (eNB)", or "access point", and the term "user equipment (UE)" may be replaced with the term "terminal", "mobile station (MS)", or "mobile subscriber station (MSS)".

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

What is claimed is:
1. A method for receiving a control channel in a subframe by a user equipment (UE) in a wireless communication system, wherein the subframe is divided into a control region and a data region in a time domain, the control region including a maximum of three or four orthogonal frequency division multiplexing (OFDM) symbols from a start of the subframe and the data region including remaining OFDM symbols in the subframe, the method comprising:

detecting a first type control channel in the control region of the subframe,
  wherein, based on a scheduling related to a second type control channel being configured for the UE, when the first type control channel is detected in an overlap resource region in which a common search space (CSS) for the first type control channel and a UE-specific search space (USS) for the first type control channel overlap with each other, the first type control channel is determined to be associated with the CSS,
  wherein, based on the scheduling related to the second type control channel not being configured for the UE and a carrier indicator field (CIF) not being configured for the first type control channel, when the first type control channel is detected in the overlap resource region, the first type control channel is determined to be associated with the USS,
  wherein the first type control channel is a physical downlink control channel transmitted in the control region of the subframe, and the second type control channel is a physical downlink control channel transmitted in the data region of the subframe, and
  wherein the CSS is a search space commonly configured for a plurality of UEs and the USS is a search space UE-specifically configured for the UE.

2. The method according to claim 1, wherein, when the UE detects the second type control channel through the data region of the subframe, the first type control channel detected in the overlap resource region is determined to be associated with the CSS.

3. The method according to claim 1, wherein the first type control channel is determined to be associated with the CSS only when the CSS for the first type control channel and the USS for the first type control channel fully overlap with each other in the subframe.

4. The method according to claim 1, wherein the first type control channel detected through the overlap resource region is scrambled with a same cyclic redundancy check (CRC), has a same payload size, or has a same first control channel element index with respect to the CSS and the USS.

5. The method according to claim 1, wherein the first type control channel detected through the overlap resource region has carrier indicator fields with different sizes, has sounding reference signal (SRS) request fields with different sizes, or channel state information (CSI) request fields with different sizes with respect to the CSS and the USS.

6. The method according to claim 1, wherein the detecting comprises monitoring the first type control channel in a remaining resource region except for the overlap resource region in the CSS.

7. The method according to claim 1, wherein the control region of the subframe does not overlap with the data region of the subframe.

8. A user equipment (UE) configured to receive a control channel in a subframe in a wireless communication system, wherein the subframe is divided into a control region and a data region in a time domain, the control region including a maximum of three or four orthogonal frequency division multiplexing (OFDM) symbols from a start of the subframe and the data region including remaining OFDM symbols in the subframe, the UE comprising:

a processor configured to detect a first type control channel in the control region of the subframe,
  wherein, based on a scheduling related to a second type control channel being configured for the UE, when the first type control channel is detected in an overlap resource region in which a common search space (CSS) for the first type control channel and a UE-specific search space (USS) for the first type control channel overlap with each other, the first type control channel is determined to be associated with the CSS,
  wherein, based on the scheduling related to the second type control channel not being configured for the UE and a carrier indicator field (CIF) not being configured for the first type control channel, when the first type control channel is detected in the overlap resource region, the first type control channel is determined to be associated with the USS,
  wherein the first type control channel is a physical downlink control channel transmitted in the control region of the subframe, and the second type control channel is a physical downlink control channel transmitted in the data region of the subframe, and
  wherein the CSS is a search space commonly configured for a plurality of UEs and the USS is a search space UE-specifically configured for the UE.

9. The UE according to claim 8, wherein, when the UE detects the second type control channel through the data region of the subframe, the first type control channel detected in the overlap resource region is determined to be associated with the CSS.

10. The UE according to claim 8, wherein the first type control channel is determined to be associated with the CSS only when the CSS for the first type control channel and the USS for the first type control channel fully overlap with each other in the subframe.

11. The UE according to claim 8, wherein the first type control channel detected through the overlap resource region is scrambled with a same cyclic redundancy check (CRC), has a same payload size, or has a same first control channel element index with respect to the CSS and the USS.

12. The UE according to claim 8, wherein the first type control channel detected through the overlap resource region has carrier indicator fields with different sizes, has sounding reference signal (SRS) request fields with different sizes, or channel state information (CSI) request fields with different sizes respect to the CSS and the USS.

13. The UE according to claim 8, wherein the detecting comprises monitoring the first type control channel in a remaining resource region except for the overlap resource region in the CSS.

14. The UE according to claim 8, wherein the control region of the subframe does not overlap with the data region of the subframe.

* * * * *